Feb. 25, 1969  J. R. ALBURGER  3,429,826
GEL-FORMING INSPECTION PENETRANT AND EMULSIFIER COMPOSITIONS
EMPLOYING HYDROPHYLIC AND LIPOPHYLIC SURFACTANTS
Filed Oct. 17, 1967

INVENTOR.
James R. Alburger

United States Patent Office 3,429,826
Patented Feb. 25, 1969

3,429,826
GEL-FORMING INSPECTION PENETRANT
AND EMULSIFIER COMPOSITIONS EMPLOYING HYDROPHYLIC AND LIPOPHYLIC SURFACTANTS
James R. Alburger, 5007 Hillard Ave.,
La Canada, Calif. 91011
Continuation-in-part of application Ser. No. 497,058,
Oct. 18, 1965. This application Oct. 17, 1967, Ser.
No. 675,896
U.S. Cl. 252—301.2     8 Claims
Int. Cl. C09k 1/02; G01n 21/16

ABSTRACT OF THE DISCLOSURE

An inspection penetrant process and applicable water-washable penetrant and emulsifier compositions which utilize as essential ingredients a combination of lipophylic and hydrophylic surfactant liquids. By employing these two ingredients in appropriate relative proportions, water-washable or water-emulsifiable compositions are formulated which exhibit a feature of a broad gel-range such that a high level of flaw entrapment efficiency is obtained. By use of appropriate extender liquids, such as glycols, mineral thinners, or other solvents, the gel-range characteristic and resultant flaw entrapment efficiency may be adjusted to a desired condition.

---

This application is a continuation-in-part of application Ser. No. 497,058, filed Oct. 18, 1965, now issued Patent No. 3,349,041, for "Gel-Forming Inspection Penetrant and Emulsifier Composition."

The present invention relates to penetrant inspection processes, and more particularly to improved penetrant flaw tracer compositions and emulsifier compositions; and to improved penetrant inspection processes utilizing said compositions.

Penetrant inspection processes have been well known in the prior art and have had as their purpose the detection in test bodies of extremely small surface discontinuities and subsurface flaws having surface openings. The test bodies, or parts, may be constructed of metal, ceramic, or other material. The known processes have involved non-destructive inspection penetrant testing procedures, with the usual procedure including, as a first step, the immersion of the test bodies in a penetrant flaw tracer liquid having dissolved therein either a fluorescent dye or a nonfluorescent visible dye. The penetrant flaw tracer liquid usually employed has been formulated of an oily liquid vehicle (such as refined kerosene or base oil), within which vehicle the dye is dissolved.

After immersion of the test bodies in the penetrant liquid for an appropriate dwell period, the test bodies are withdrawn from the liquid and are then subjected to draining, emulsification, and washing operations, for the purpose of removing any penetrant liquid adhering to the surfaces thereof. Minute entrapments of the penetrant liquid, however, remain in any surface discontinuities or subsurface flaws having surface openings, even though extremely small. If the penetrant liquid employed contains a fluorescent dye, the entrapments may be rendered visible by exposure of the surfaces of the test bodies to ultraviolet radiation. If, on the other hand, the penetrant liquid contains a nonfluorescent visible color dye, the entrapments can be viewed in ordinary light.

Two major types of penetrant inspection processes have been utilized. In the case of the so-called "post-emulsifier" type of penetrant inspection process, the penetrant inspection liquid is removed from the surfaces of the test bodies during the washing step through the use of water together with a suitable emulsifier composition. In accordance with the so-called "self-emulsifiable," or water-washable, type of penetrant process, the oily vehicle of the penetrant flaw tracer liquid is compounded together with one or more detergents. As a result, upon contact with water, the penetrant liquid forms an emulsion. Consequently, after the test bodies have been immersed in the penetrant liquid, they may simply be rinsed in water, whereupon the surface penetrant liquid becomes emulsified and is removed without the use of a supplementary emulsifier composition.

The conventional oil-phase penetrant liquids of the water-washable type, as well as the oil-phase emulsifiers employed in the conventional post-emulsifier penetrant processes, present a number of disadvantages in use. Firstly, the emulsions which form during the washing step are often not completely stable, so that, as a result, oil and water phase separation often occurs, leading to a re-precipitation of nonemulsified materials on the surfaces being cleaned. Secondly, the presence of the oily re-precipitated residues, not being again soluble in water, may lead to undesirable effects, such as intergranular corrosion, or chemical reactivity in the case of test bodies used in liquid oxygen systems.

As a further disadvantage of a water-washable penetrant of the conventional type, such materials can provide a high level of flaw entrapment efficiency only if the solubilizing strength of the detergent system employed is just sufficient, and no greater, to render the oily component of the penetrant liquid emulsifiable in water. If the solubilizing strength of the detergents used is too great, the flaw entrapments are too readily emulsified and substantial portions thereof may be removed from the flaws by the water employed during the washing step. In view of the relatively low solubilizing strength of the detergent systems utilized, the known water-washable penetrants have often presented problems with regard to re-precipitation and emulsion instability.

With respect to emulsifier compositions which are employed for the removal of oily residues of water-insoluble penetrant or other water-insoluble surface contaminants, it is again found that excessive activity or solubilizing strength of conventional emulsifiers can act to strip out small entrapments of penetrant to an excessive degree. The known emulsifier materials have often presented problems with regard to flaw entrapment efficiency, emulsion instability, and economy in use.

It is, therefore, an object of the present invention to provide an improved water-washable penetrant flaw tracer composition.

Another object of the invention is to provide a water-washable penetrant flaw tracer composition which presents features of improved stability of the emulsion formed upon contact thereof with water.

Still another object of the present invention is to provide water-washable penetrant flaw tracer compositions which offer unusually high levels of flaw entrapment efficiency as compared to the penetrant compositions of the prior art.

A further object of the invention is to provide an improved emulsifier composition particularly adapted for use in the post-emulsifier type of penetrant inspection processes.

A still further object of the invention is to provide an improved emulsifier composition which presents features of high emulsion stability and economy in use.

Another object of the present invention is to provide an improved penetrant inspection process of the post-emulsifier type.

Another object of the present invention is to provide an inspection process of the self-emulsifiable, or water-washable type.

These and other objects of the invention will be made more apparent in the following description thereof when read in conjunction with the accompanying drawings, in which.

In accordance with the present invention, there are provided water-washable and normally liquid testing compositions for use in the detection of surface discontinuities in test bodies. Each of the testing compositions comprises, in combination, the following two basic constituents:

(1) A normally liquid water-soluble surfactant having a hydrophylic character; and
(2) A normally liquid water-insoluble surfactant having a lipophylic character.

In addition to the two basic constituents, certain of the compositions of the invention may contain supplemental ingredients as follows:

(a) A normally liquid glycol,
(b) An indicator dye; and
(c) An inexpensive extender liquid.

Inasmuch as the formulations of the invention may act as emulsifiers in post-emulsifier penetrant processes, as will be described below, and in that connection may tolerate contamination by substantial amounts of oily liquid materials while still retaining a water-washable characteristic, and inasmuch as the formulations may tolerate the addition of large quantities of water while retaining a stable characteristic of solution or emulsion, as described below, it is, of course, apparent that inexpensive oily liquids, such as mineral solvents, may be used in limited proportional amounts, or substantial amounts of water may be used, for the purpose of extending the formulation and reducing its cost per unit volume, or for other purposes, as for example, for adjusting the viscosity of the formulation or for controlling and adjusting the magnitude of the gel-range feature.

In order to better understand the scope of the present invention, it will be helpful to summarize the above-mentioned copending application, Ser. No. 497,058, of which this application is a continuation-in-part.

In the aforesaid application, Ser. No. 497,058, there are described and claimed gel-forming inspection penetrant emulsifier compositions which utilize as basic or essential ingredients two materials which are, respectively, high-ethoxy ethoxylated alkylphenols and low-ethoxy ethoxylated alkylphenols. A low-ethoxy ethoxylated alkylphenol is an alkylphenol which contains no ethylene oxide, or which is reacted with sufficient ethylene oxide to produce an ethoxylated compound wherein the proportion of ethylene oxide amounts to somewhere between zero and 5 mols of ethylene oxide per mol of alkylphenol. Such materials are insoluble in water and soluble in oils (lipophylic).

A high-ethoxy ethoxylated alkylphenol is an alkylphenol which is reacted with sufficient ethylene oxide to produce an ethoxylated compound wherein the proportion of ethylene oxide amounts to somewhere betwen 7 and 15 mols of ethylene oxide per mol of alkylphenol. Such materials are soluble in water (hydrophylic).

In accordance with the disclosure of the aforesaid copending application, a combination of these two basic ingredients, when formulated in suitable relative proportions, results in an emulsifiable mixture which exhibits a broad gel range when water is added. The present invention contemplates the formulation of similar emulsifier compositions, except that various other lipophylic and hydrophylic surfactant materials, as described hereinbelow, are utilized, selectively and in combination, as substituents for the aforesaid ethoxylated alklyphenols.

I have discovered that a wide variety of surfactant materials may be utilized for the purpose of the present invention, the only requirement being that at least one of the basic surfactant ingredients must be lipophylic or oil soluble, while the other must be hydrophylic or water soluble.

As I have pointed out in my now-issued U.S. Patent No. 3,311,479, water-solubility and oil-solubility of materials are matters of degree. Insofar as ethoxylated alkylphenols, ethoxylated fatty acids, esters, and oils, ethoxylated alcohols, ethoxylated amines and amides, and the like, are concerned, the degree of water solubility or emulsifiability increases as the proportional amount of ethylene oxide is increased. Also, various materials, such as sorbitan derivatives, glycerol esters, and acetylated or sulfated monoglycerides, and the like, exhibit varying degrees of water solubility. That is to say, their hydrophylic or lipophylic character, as the case may be, may vary considerably depending on the chemical nature of the material.

Accordingly, it will be understood that when making a substitution of a surfactant material in an emulsifier formulation from the listing set forth hereinbelow, one or both of the ethoxylated alkylphenols of the aforesaid copending application, Ser. No. 497,058, the substituent material may be selected to have about the same hydrophylic or lipophylic character, in which case similar gel-forming results will be obtained. Furthermore, it will be understood that in making a substitution for a certain lipophylic ethoxylated alkylphenol, for example, such that the water emulsifiability of the substituent material is less than that of the ethoxylated alkylphenol, then a lesser amount of the substituent ingredient will be required (and vice versa).

In this present invention, I may utilize either one but not both of the ethoxylated alkylphenol basic ingredients of the aforesaid copending application, Ser. No. 497,058. Also, I may use as a substituent ingredient, for either one or both of the ethylated alkylphenols, at least one or a combination of the surfactant materials which are listed hereinbelow.

The water-soluble ethoxylated alkylphenol constituent of the compositions of the invention, if used, is any one, or a combination, of the ethoxylated alkylphenols which are normally liquid. Such normally liquid alkylphenols have the following chemical structure:

In the above structure, P is a phenolic nucleus, R is an ethoxy group, and R′ is an alkyl or polyalkyl chain structure.

For the purpose of this specification, a phenolic nucleus is defined as an aromatic structure containing a "phenolic" hydroxyl group (or groups), the aromatic structure being any one of the structures; benzene, naphthalene, or diphenyl (biphenyl). It has been found that any one of these three types of nuclei can be monoalkylated, dialkylated, or polyalkylated to form so-called alkylated phenols, and the number of carbon atoms in any given alkyl chain, or R′ group, may be as low as 5 to as high as 18; that is, for the purpose of this invention. Furthermore, the alkyl chains may occur in isomeric forms, either as straight or branched chains, depending on the mode of synthesis.

The thus-alkylated phenols are condensed with an R group which may consist of from 7 to 15 mols of ethylene oxide per mol of alkylphenol to produce the water-soluble alkylphenols suitable for the purpose of the invention. R may, therefore, be defined as the chemical structure $(CH_2CH_2O)_xH$, where in the case of the water-sol- uble ethoxylated alkylphenols of the invention $x$ may have a value of from 7 to 15.

The water-insoluble ethoxylated alkylphenol constituent, if employed in the testing compositions of the invention, has the same chemical structure as shown above; however, from zero to 5 mols of ethylene oxide per mol of alkylphenol are here provided, $x$ having a range of values from zero to 5.

An alkylphenol with zero ethoxy content is a special case representing a limiting condition of the water-insoluble class of ethoxylated alkylphenols. As will be explained below, the characteristic behaviour of the water-insoluble ethoxylated alkylphenols depends on the length of the ethoxy chain, and it has been demonstrated that a uniform transition of such characteristics occurs from zero ethoxy content, through fractional values of ethoxy content, up to about 5 mols of ethylene oxide per mol of alkylphenol. Within this range of ethoxy/alkylphenol mol ratios, a preferred ratio is about 1.5 mols ethylene oxide per mol of alkylphenol.

Accordingly, it will be understood that the chemical structures for the ethoxylated alkylphenols, when such are utilized for this invention, may include the following:

(a)

(b)

(c)

These three types of compounds, all of which may be classed as ethoxylated alkylphenols are well known in the science of surfactant chemistry, although industrial production, in large tonnages, is concentrated mainly on the type (a) structure, and in the monoalkylated 8 or 9 carbon alkyl chain lengths, providing ethoxylated octylphenols or ethoxylated nonylphenols.

All of the above-described ethoxylated alkylphenols behave in a closely similar manner with respect to water solubility, and the degree of water solubility, in each case, depends on the ethoxy content or mol ratio of ethylene oxide with respect to the alkylphenol portion of the material. This similarity in behaviour permits any of the three types of materials to be substituted, each for the other, in the formulations to be given in this specification and substantially equivalent gel-forming performance results will be obtained.

Among the ethoxylated alkylphenols which are suitable for the purpose of the invention are the following:

(a)
Ethoxylated diamylphenol
Ethoxylated octylphenol
Ethoxylated nonylphenol
Ethoxylated dinonylphenol
Ethoxylated trinonylphenol
Ethoxylated decylphenol
Ethoxylated didecylphenol
Ethoxylated undecylphenol
Ethoxylated dodecylphenol
Ethoxylated octyldecylphenol (b)
Ethoxylated diamylnaphthol
Ethoxylated octylnaphthol
Ethoxylated nonylnaphthol
Ethoxylated dinonylnaphthol
Ethoxylated trinonylnaphthol
Ethoxylated octyldecylnaphthol (c)
Ethoxylated diamyl p-p′ biphenol
Ethoxylated octyl p-p′ biphenol
Ethoxylated nonyl p-p′ biphenol
Ethoxylated dinonyl p-p′ biphenol
Ethoxylated octyldecyl p-p′biphenol The various lipophylic and hydrophylic surfactant materials which are used selectively and in combination as one or both of the basic constituents of the emulsifier compositions of the invention fall into several categories as follows:

Ethoxylated alcohols
Ethoxylated amines
Ethoxylated amides
Ethoxylated fatty acid
Ethoxylated fatty esters
Ethoxylated vegetable oils
Fatty esters
Glycerol esters
Monoglyceride derivities
Alkanolamides Certain other of the following types of surfactant materials may be utilized; however, they have limited use due to the presence of sulfur which is deleterious with respect to corrosion in many inspection applications.

Sulfonated oils
Sulfonated amides
Sulfonated amines
Alkyl sulfonates
Diphenyl sulfonate derivatives Materials which are suitable for the purpose of the invention may be drawn from any of the above categories. However, the preferred materials are ethoxylated compounds, sorbitan derivatives, and monoglycerides and derivatives. Among the various compounds which are preferred for the purpose of the invention are the following:

Polyoxyethylene sorbitan monolaurate
Polyoxyethylene sorbitan monostearate
Polyoxyethylene sorbitan monopalmitate
Polyoxyethylene sorbitan tristearate
Polyoxyethylene sorbitan monooleate
Polyoxyethylene sorbitan trioleate
Polyoxyethylene sorbitol laurate
Polyoxyethylene sorbitol hexaoleate
Polyoxyethylene sorbitol septaoleate
Polyoxyethylene oleate-laurate
Polyoxyethylene ester of mixed fatty and resin acid
Polyoxyethylene ether alcohol
Polyoxyethylene oxypropylene glucoside oleate
Glycerol monooleate
Sorbitan monooleate
Sorbitan trioleate
Sorbitan partial fatty ester In connection with the evaluation of the lipophylic and hydrophylic character of surfactant materials, Atlas Powder Company, Chemicals Division, has devised a method of rating, known as the HLB System (or hydrophile-lipophile balance). Numerical HLB values have been assigned to many commercially available surfactants, those which are insoluble in water having HLB values between zero and 10, and those which are soluble in water having HLB values between 10 and 20.

For purposes of this invention, a hydrophylic ingredient may have an HLB value greater than 10. However, I have found that in the case of the lipophylic ingredient, if the HLB value is not less than about 7 satisfactory gel formation is not obtained. Accordingly, lipophylic compounds, such as sorbitan monolaurate, glycerol sorbitan laurate, and glycerol mannitan laurate, having HLB values of 8.6, 7.6, and 7.1, respectively, are not useful for the purpose of the invention.

In the above listing of surfactant materials, all of the polyoxyethylene derivitives, with the exception of polyoxyethylene oxypropylene glucoside oleate, are hydrophylic in character, while only this latter material and the glycerol monooleate, the sorbitan monooleate, the sorbitan trioleate, and the sorbitan partial fatty ester are sufficiently lipophylic in character to be suitable as a lipophylic ingredient.

The examples given in the above listing are, of course, only representative of many commercially available surfactants, any of which can be used in combination in accordance with this invention, provided their HLB values fall within the ranges of zero to 7 for the lipophylic material and 10 to 20 for the hydrophylic material, as described above.

With regard to the glycol, which may be a constituent of a testing composition in accordance with the invention, any glycol which is normally liquid is suitable for use. Within the class of glycols which are normally liquid, and thus usable for the purpose of the invention, are the following:

Ethylene glycol
Diethylene glycol
Triethylene glycol
Propylene glycol
Dipropylene glycol
Tripropylene glycol
Hexylene glycol
Polyethylene glycol
Glycerin Such glycol ingredients may be included in the composition of the invention for the purpose of adjusting the viscosity of the mixture, or for extending the volume of the mixture to reduce its cost per unit volume.

As pointed out above, the compositions of the invention may contain one or more inactive diluent liquids for the purpose of extending the volume of the composition of the invention, or for other purposes. Any one or a combination of oily mineral thinners, or other diluents, such as water, may be utilized, and the materials listed as follows being representative of the type materials which have been found suitable:

Light weight mineral oil
Base oil 100 pale
Mineral thinner
Kerosene
Diesel fuel
Isopropanol
Methylene chloride
Trichloroethylene
Perchloroethylene
Fluorocarbon propellant liquid
Water Each of the water-washable testing compositions of the invention may include, as stated above, an indicator dye. The dyestuff utilized may be in the form of a fluorescent sensitizer or of a visible dye. If a flourescent sensitizer is employed, a "color-former" dye may be used in conjunction therewith. Any suitable dye or mixture of dyes may be chosen for the purpose.

Listed below are typical fluorescent sensitizers and color-former dyes which have been found to be particularly useful for the purpose of the present invention. The dyes listed have been disclosed in my copending application, Ser. No. 323,529, filed Nov. 13, 1963, for "Fluorescent Tracers." These sensitizers and color-formers may be of the water-soluble type or of the water-insoluble type. They are identified in accordance with their standard designation in the Color Index (2d Ed. 1956, vol. II) published by the Society of Dyers Colourists, Dean House, Picadilly-Bradford, Yorkshire, England; The American Association of Textile Chemists and Colorists; and the Lowell Technological Institute, Lowell, Massachusetts, U.S.A.

SENSITIZERS

C.I. Fluorescent Brightening Agent No. 46
C.I. Fluorescent Brightening Agent No. 8
C.I. Fluorescent Brightening Agent No. 69
C.I. Fluorescent Brightening Agent No. 78
C.I. Fluorescent Brightening Agent No. 26
C.I. Fluorescent Brightening Agent No. 68

COLOR-FORMER DYES

C.I. Fluorescent Brightening Agent No. 4
C.I. Fluorescent Brightening Agent No. 74 (also known as C.I. 45550, Solvent Green 4)
C.I. Fluorescent Brightening Agent No. 75 (also known as C.I. Solvent Yellow No. 43)
C.I. 59075 (also known as C.I. Solvent Green No. 5)
C.I. Basic Green No. 1
C.I. Acid Blue No. 104
C.I Basic Violet No. 10

Among the suitable non-fluorescent, or visible, dyes which may be employed in accordance with the invention, are a number of red, yellow, and blue dyes, such as the following:

C.I. Solvent Red No. 76
C.I. Solvent Yellow No. 13
C.I. Solvent Blue No. 11

The previously identified basic constituents and supplemental ingredients of the testing compositions of the invention may be employed in various concentrations. The glycol ingredient, when used, is preferably employed in a concentration within the approximate range of zero to 45%. The water-soluble hydrophylic constituent is preferably employed in a concentration within the approximate range of 30–80% when used in conjunction with a glycol ingredient, and in a concentration within the approximate range of 35–85% when used without a glycol ingredient. The water-insoluble lipophylic constituent is preferably employed in a concentration within the approximate range of 10–50% when used in conjunction with a glycol ingredient, and in a concentration within the approximate range of 15–65% when used without a glycol ingredient. The indicator dye, when used, is preferably present in a concentration within the approximate range of 0.1–40%.

Naturally, if an extender liquid is employed in the formulation, the above percentage values will be correspondingly reduced. However, the relative proportions of the essential basic ingredients will still fall approximately in the ranges as set forth above.

The water-insoluble ethoxylated compounds which may be used as an ingredient in the compositions of the invention exhibit varying degrees of insolubility, such that the water-insolubility becomes greater as the ethoxy content is reduced, being a maximum when the ethoxy content is zero. Accordingly, it has been found that when the ethoxy content of this ingredient is zero, its proportional content in compositions of the invention will normally be reduced slightly as compared to that of an ethoxylated compound; that is, for similar results. However, the range of concentrations usable will still be about the same as stated above.

In order to properly understand the unique feature of the compositions of the invention with respect to penetrant inspection processes, it is helpful to examine the geometry of a penetrant flaw entrapment and the physical behaviour of penetrant materials as they enter into and exude from surface flaws.

Figure 1:
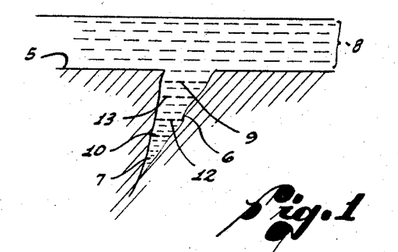
FIG. 1 is a diagrammatic representation, in cross-section, of a surface flaw containing an entrapment of a water-washable inspection penetrant of the invention.

Referring now to FIG. 1, a test surface 5 contains a flaw in the nature of a crack 6. For the purpose of this illustration, it is assumed that a self-emulsifiable penetrant has been applied to the test surface 5 so that it has entered into the flaw 6, forming an entrapment of penetrant 7. In the washing step of the penetrant inspection process, the surface 5 is washed with water, as indicated by a water layer 8, to remove surface penetrant. During this washing operation, some of the wash water diffuses into the flaw entrapment 7, producing a diffusion zone represented by the lines 9 and 10. At the outer extremity of the diffusion zone, at line 9, there is 100% water present, while at the inner extremity of the zone, at line 10, there is zero percent water present. Between these two extremities, there are found intermediate percentages of water in a water/penetrant mixture.

At some point inside the above-described diffusion zone, there exists a region, indicated by lines 12 and 13, in which a pronounced thickening or increase in viscosity occurs. Typical water-washable penetrants, as known in the prior art, exhibit a thickening or gel-formation at about 20% added water, and the gel condition persists up to about 50% to 100% added water. Hence, the region indicated by line 12 and 13 corresponds to a range of water content in the diffusion zone from about 15% up to a maximum of about 50%. Accordingly, it is seen that the portions of the diffusion zone which fall outside the 50% level of water content, as represented by line 13, will have a relatively low viscosity as compared to the portions of the mixture which fall in the gel-zone between lines 12 and 13.

Figure 2:
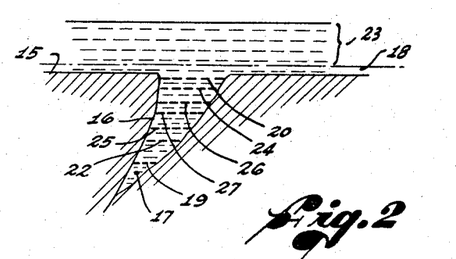
FIG. 2 is a diagrammatic representation, in cross-section, of a surface flaw containing an entrapment of a water-insoluble penetrant emulsified with an emulsifier of the invention.

Referring now to FIG. 2, a test surface 15 contains a flaw 16, and in this case it is assumed that a water-insoluble oily penetrant has been applied to the test surface 15 so that it has entered into the flaw 16 forming an entrapment 17. In order to render the oily penetrant washable in water, an emulsifier composition is applied to surface 15, as represented by an emulsifier layer 18, whereupon it blends with any oily penetrant present on the surface 15, rendering it soluble in water. During this emulsification operation, some of the emulsifier diffuses into the entrapment 17 producing an emulsifier/penetrant diffusion zone represented by lines 19 and 20. A portion of this penetrant/emulsifier diffusion zone is soluble in water, the soluble portion being that which lies outside a point in the entrapment 17 represented by line 22. The exact position of line 22 in the flaw entrapment depends on the emulsifiability of the entrapped penetrant and the emulsifying capability or strength of the emulsifier. In any event, there always exists a point of washability transition, or "washability break," in the emulsified flaw entrapment, as represented by line 22.

Now, when water is applied to the test surface, as indicated by layer 23, a condition similar to that illustrated in FIG. 1 is obtained. The emulsifier layer 18 and emulsified surface penetrant is flushed away by the wash water, leaving a residual entrapment of material, the outer extremity of which is represented by line 24, and then some of the water diffuses into the entrapment 17 to form a diffusion zone, represented by lines 24 and 25. Again, as in FIG. 1, there is 100% water present at the outer extremity of the diffusion zone at line 24, while there is zero percent water present at the inner extremity of the diffusion zone at line 25. And again, between these two extremities, there are intermediate percentages of water in a water/emulsified penetrant mixture.

At some point between lines 24 and 25, there exists a region, indicated by lines 26 and 27, in which a pronounced thickening or increase in viscosity occurs. It is thus seen that both in self-emulsifiable penetrants, and in emulsifiers which are applied to water-insoluble penetrant entrapments, similar flaw entrapment thickening performance characteristics are found. However, in prior art self-emulsifiable penetrants and emulsifiers, the zones of thickening are found to be well down inside the surface flaws, leaving a relatively large portion of the entrapped material in a condition of low viscosity, permitting it to be readily flushed away in the wash operation. This condition, of course, leads to a relatively low level of flaw entrapment efficiency.

Figure 3:
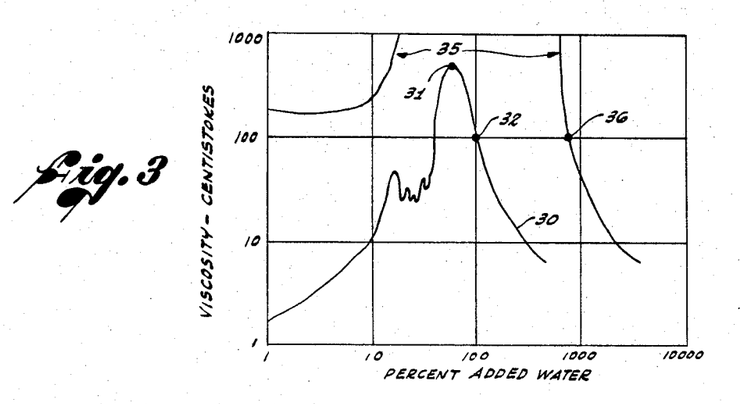
FIG. 3 is a graph illustrating the viscosity characteristics of emulsifier compositions plotted as a function of percent added water.

Referring now to FIG. 3, curve 30 represents a charting of viscosity of a typical prior art self-emulsifiable penetrant (or emulsifier) plotted as a function of percent added water. As water is added to the penetrant, the viscosity rises and passes through several minor fluctuations, and then rises steeply into a highly viscous condition, represented by point 31. In some cases, the point of maximum viscosity 31 may be well above the top of the graph, such that the material becomes a stiff gel. In any event, the typical prior art self-emulsifiable penetrants and emulsifiers all exhibit a sharp drop in viscosity upon the addition of more water, this drop in viscosity occurring at about 50% to 100% added water. For purposes of definition and comparison evaluation between emulsifier and self-emulsifiable penetrant compositions, the so-called value of "gel-break" in an emulsifier material is the percent added water at which the viscosity passes downward through the viscosity value of 100 centistokes, as indicated by point 32.

Also illustrated in FIG. 3 is a curve 35 which is a charting of viscosity of a typical composition of the invention, in which viscosity is plotted as a function of percent added water. Here again, as in curve 30, the viscosity rises as water is added, until a stiff gel is formed. However, the mixture remains in a gel condition up to a point well beyond several hundred percent added water, and in some cases the gel-break does not occur until more than 800 percent water has been added.

The important advantage of this broad gel zone, as illustrated by curve 35, can be best understood by again referring to FIG. 1. In FIG. 1, line 13 represents 100% water content in the gel zone. It will be seen that 100% added water to gel-break, such as might be obtained in a prior art penetrant, would actually constitute 50% water content (at gel-break). Hence, for this condition half of the diffusion zone between lines 9 and 10 of FIG. 1, would be flushed away. On the other hand, in a self-emulsifiable penetrant of the invention, which tolerates 800% added water to gel-break, the water content at the point of gel-break is 89%. Hence, under this condition, the gel-break line 13 in FIG. 1 is moved out close to line 9 (at the value of 89% water content), so that the washing process removes only 11% of the penetrant/water mixture of the diffusion zone.

It can, therefore, be said that the entrapment efficiency in washing is 50% or less in the case of prior art self-emulsifiable penetrants and emulsifiers, and in the range of 89% for the example given of a penetrant composition of the invention. In various examples of penetrant and emulsifier compositions of the invention, as given below, gel-break may occur at percentages of added water of from 250% to as much as 850%, thereby yielding entrapment efficiencies of from 71% to 89.5%. Mathematically, the entrapment efficiency in washing may be expressed by the relationship $$E_w = \frac{I_n}{100 + I_n}$$

where $I_n$ is the percent added water to gel-break.

As an essential feature of the invention, it has been found that there exists a critical balance, within a relatively narrow range of proportional content, between the two basic constituents as stated above, at which the above-described broad gel-range conditions are obtained. In addition, it has been found that when a supplemental ingredient, such as a glycol or an extender thinner, is included in the composition, this critical balance condition still pertains, although the relative proportions of ingredients necessary to achieve an optimum condition of broad gel-range may be shifted slightly.

Figure 4:
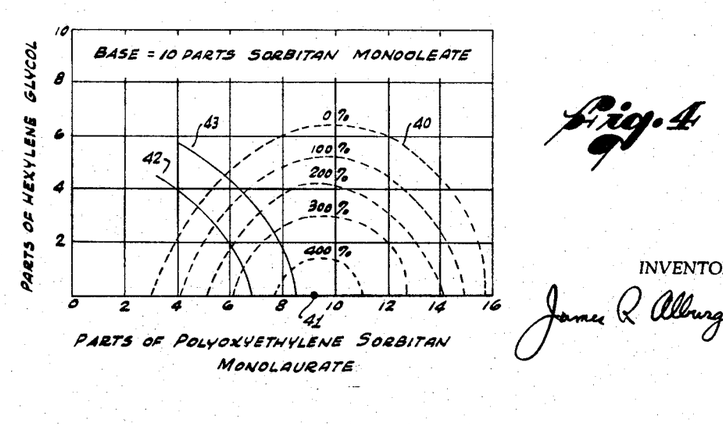
FIG. 4 is a graph illustrating the "gel-break" and solubility characteristics of compositions of the invention.

Referring now to FIG. 4, a chart is shown herein which the percent added water at gel-break is charted for various relative proportions of ingredients in a three-phase system consisting of a water-insoluble lipophylic surfactant, a water-soluble hydrophylic surfactant, and a glycol. For the purpose of preparing this chart, the water-insoluble surfactant employed was sorbitan monooleate, and is present in the test formulations in the amount of ten proportional parts. The water-soluble surfactant employed was polyoxyethylene sorbitan monolaurate. This material and the glycol ingredient, which was hexylene glycol, were mixed in varying proportions with the ten proportional parts of the sorbitan monooleate, and the gel-break for each condition of admixture was determined.

Examination of the chart of FIG. 4 reveals that there is well defined zone within the field of possible formulations employing the three ingredients in which a substantial gel condition is obtained. This same characteristic of gel formation is obtained in formulations of any of the ingredients described and listed above. In the region outside the line 40, no gel condition is obtained at all, while inside the region of gel formation, the value of gel-break rises rapidly and reaches a peak at point 41. Point 41 is generally found on the abscissa of the chart where the glycol content of the composition is zero.

Also shown in FIG. 4 is a line 42 which represents a threshold condition of washability for the above-described family of mixtures. At all points to the left of line 40, the mixtures of ingredients are insoluble in water, even though they may absorb water to form thickened or gel-like material. Thus, such water-insoluble compositions cannot be used as water-washable inspection penetrants because residual penetrant on the surfaces of test parts will not wash clean. The position of this threshold of washability may be altered by altering the HLB value of the water-insoluble surfactant ingredient in the formulation, as illustrated by line 43. Line 43 represents the threshold of washability of formulations in which the ten proportional parts of sorbitan monooleate are replaced with three parts of nonylphenol (with zero ethoxy content). This alteration of the formulation does not shift the position of point 41 to any appreciable degree; however, it is found that a formulation made using nonylphenol and having a gel-break characteristic corresponding to point 41 is now wash removable only with considerable difficulty.

Although a margial-washability penetrant or emulsifier formulation such as this, employing nonylphenol as an ingredient, is sometimes desirable and can be successfully used to provide excellent entrapment efficiency, extreme care must be taken to insure proper wash removal of the penetrant from test parts. Hence, for practical considerations in handling the material, a characteristic washability threshold close to that illustrated by line 42 is usually to be preferred.

It will be seen that by properly selecting the chemical nature of the two or three liquid ingredients which may be included in the compositions of the invention, and by adjusting the relative hydrophylic and lipophylic features of the surfactant ingredients, various formulations may be provided which exhibit consistently higher levels of entrapment efficiency and washability characteristics which may be optimum for given operating conditions.

In preparing a testing composition in accordance with the invention, it is preferred that the water-insoluble and water-soluble surfactant ingredients be first mixed together in proportional amounts such that the mixture is simultaneously washable in water, as determined by a wash-removability test on a flat metal panel or the like, and capable of forming a gel upon the addition of water to the mixture. Where a maximum value for the gel-break is wanted, the relative proportions of the two surfactant ingredients may be varied step-wise and tested for the point of gel-break, thus permitting the selection of an optimum formulation as required. Then, if so desired, the glycol ingredient or an extender liquid may be added for the purpose of adjusting the initial viscosity of the mixture or for the purpose of extending the volume of the mixture to reduce its cost per unit volume. The final formulation which may be selected by consideration of the optimum balance condition to provide a desired value for gel-break, and of acceptable viscosity characteristics, and of economic factors, will be one which exhibits a superior entrapment efficiency and stability as compared to conventional water-washable penetrants and emulsifiers.

If the formulation is to be used as an inspection emulsifier, no indicator dye is required, but if it is to be used as an inspection penetrant, an appropriate indicator dye or dyes, either fluorescent or visible color, may be added in accordance with known practices to provide a desired level of flaw detection performance.

Various other ingredients may be added to the formulations of the invention. For example, a volatile material such as methylene chloride may be utilized to lower the viscosity of a penetrant mixture of the invention, and after the penetrant is applied to a test surface, the volatile ingredient will evaporate and leave the applied penetrant in a water-washable condition. Also, various fluorocarbon "Freon" type materials may be included with the formulations of the invention, thereby acting as aerosol propellants when the product is packaged in spray cans.

The performance characteristics of the testing compositions of the invention depend primarily on the presence in each composition of the two types of hydrophylic and lipophylic constituents. Such performance characteristics may vary, depending upon the molecular structure and the concentration of the particular surfactant constituents employed. Generally speaking, the water-soluble surfactant constituent imparts to the composition a positive hydrophilic characteristic; while the water-insoluble surfactant constituent imparts to the composition a positive lipophilic character. Through the use of surfactant constituents of suitable molecular structure and relative HLB values, and in suitable concentrations, testing compositions in accordance with the invention may be obtained which exhibit any of a wide and continuous range of variable water-solubility characteristics. As a consequence, the practice of the invention enables easy control of the characteristics of the testing compositions provided, particularly with respect to the water-solubility of the latter.

The glycol constituents of the testing compositions of the invention behave, when used, it is believed, in the nature of coupling agents. The probable action is that of coupling the ethoxylated alkylphenols to water which enters the testing composition during the washing procedure.

The present invention provides for the use of any of the above-described testing compositions as a penetrant flaw tracer liquid in a water-washable type of penetrant inspection process for the testing of test bodies, parts, etc. Such test bodies may be constructed of metal, ceramic, or other material, and are tested for the purpose of detecting extremely small surface discontinuities and sub-surface flaw therein. Preferably, the part to be tested, or a test surface thereof, is preliminarily cleaned and degreased in conventional manner, such as by using a vapor degreaser or by washing with alcohol.

After the part has been cleaned and degreased, a penetrant flaw tracer liquid formulated in accordance with the invention is then applied either by dipping the part therein or by brushing or spraying of the liquid onto the test surface. Any suitable shape and size of test surface may be employed. The penetrant liquid is allowed to dwell on the test surface preferably for about 5–10 minutes, during which time it penetrates into any microcracks or pores in the surface. Excess penetrant is then drained off from the test surface.

After the drainage of the penetrant liquid, the part is washed by flushing thoroughly with water. The washing step is carried out in conventional manner; e.g., by means of a high pressure spray, or by agitation in a tank of water. The water employed during the washing step carries any penetrant liquid remaining on the surface into a stable emulsion, and thus washes the surface free from any oily residues.

Following the washing step, the test surface is immediately inspected for the existence of surface discontinuities, or subsurface flaws, as revealed by the presence therein of the entrapments of dye-containing penetrant liquid. If a fluorescent dye has been employed, the inspection is made under black light in a darkened inspection booth. In cases where the test object is too large to enclose in a booth, a suitable light shield may be employed.

The water-washable penetrant process just described can, if desired, be modified so as to employ a wet development step. In such cases, the penetrant liquid is applied to the part being tested, and is then drained from said part in the same manner as described above. Said part is thereafter washed in water, also as described above. Following the washing step, the part is dipped in a conventional wet developer which may, for example, consist of a suspension of talc particles in water. The part is then removed from the developer and allowed to dry. The wet developer serves to absorb entrapments as they exude from the flaws. As a result, greatly improved brightness of the flaw indications is produced.

Instead of employing a wet developer as described above, a conventional dry developer may be utilized in conjunction with the water-washable penetrant process of the invention. Such a dry developer consists of talc particles, or other similar type of powder in dry form. Also employable is the conventional type of non-aqueous wet developer, which contains alcohol, or some other non-aqueous carrier for the powder, and finally, if so desired, a dilution-expansion developer of the type described and claimed in my U.S. Patent No. 3,184,596 might be employed.

In accordance with the present invention, there are further provided water-soluble emulsifier compositions, which are particularly adapted for use in the post emulsifier type of penetrant inspection process. Each of the emulsifier compositions of the invention comprises the same basic constituents as the water-washable testing compositions already described, with the exception of the indicator dye. Thus, each of said emulsifier compositions comprises a normally liquid water-soluble surfactant, and a normally liquid water-insoluble surfactant, and in some cases, a normally liquid glycol or an extender liquid may be included in the composition.

In formulating the emulsifier compositions of the invention, the two basic constituents may be chosen and mixed together in the manner already described above and the supplemental glycol ingredient or extender liquid may be included as desired. The same relative proportions of the three constituents, as already described, are here again employed. Since the proportion of indicator dye in the testing compositions is relatively low, the preferred percentage concentration ranges for the testing compositions, as set forth above, are also approximately correct with regard to the emulsifier compositions.

The emulsifier compositions of the invention are employable in a post-emulsifier type of penetrant inspection process. In such process, a penetrant flaw tracer liquid which is of the oil-phase post-emulsifier type is first applied to the test surface, in the same manner as described above in the case of the water-washable type of process. The excess penetrant liquid is then drained from the test surface.

After the drainage of the penetrant liquid, the test surface is treated with one of the emulsifier compositions of the invention. The emulsifier composition is applied either by dipping, brushing, or spraying. If the penetrant flaw tracer liquid used contains a fluorescent dye, the emulsification step may be carried out under continuous black light inspection, so that examination of the test surface may be made to assure that the emulsifier has been liberally applied over the entire area thereof. The emulsifier is allowed to dwell on the test surface for about 2–5 minutes, during which time it mixes with the penetrant liquid on the surface and renders said penetrant liquid soluble in water.

The test surface is then washed in the same manner as already described. Again, the washing step may be carried out under continuous black light inspection to insure that all surface smears of penetrant have been removed. Any residual smears are then cleared away by a local application of emulsifier, and re-washing. After washing, the test surface is drained, and thereafter inspected for the presence of flaws, in the manner already described.

The post-emulsifier penetrant process just described can, as in the case of the water-washable process, be modified so as to employ a wet development step. Here, however, a penetrant liquid is employed consisting of a volatile solvent, such as, perchloroethylene, containing a visible dye indicator. The penetrant liquid is applied to the part being tested in a manner such as described above. Said part is then allowed to drain and dry, with the result that a surface deposit of dry dye remains. The part is thereafter immersed in the emulsifier in the same manner as already set forth above. Following a dwell time in the emulsifier of preferably about one minute, the part is washed in a manner as above described. The part is thereafter dipped in the wet developer, which may, again, consist of a suspension of talc particles in water. The part is then removed from the developer and allowed to dry. Any surface flaws which exist thus become revealed by visible dye indications.

In the process just described, the emulsified enters the surface flaws, carrying the dry dye into solution, and forming flaw entrapments of dyed emulsifier. At this point, the emulsifier becomes the equivalent of a water-washable penetrant of the invention. The washing step removes the dyed-emulsifier cleanly as a stable emulsion from the surfaces of the part. Said surfaces are thus rendered free from any oily residues. This process is "compatible" with liquid oxygen, as a result of the fact that deleterious reaction between the oxygen and oily penetrant residues are minimized.

In a process of the invention of either the post-emulsifier or the water-washable type, the washing step consists of progressively diluting the penetrant with water. After water has been added to the penetrant in the amount of about 30%, the mixture increases in viscosity to form a gel-like material. This gel-like condition persists until the proportional amount of added water reaches as much as 250% up to 850%. At this point, a stable emulsion forms, which exhibits no phase separation, even upon extensive dilution up to and beyond dilution ratios of 40 to 1.

As a result of the fact that the penetrant entrapments pass through a phase during the absorption of water, as just described, such that an extremely high viscosity ensures, said entrapments tend to "freeze" into position. Consequently, an enhanced stability of the entrapments is provided. While the penetrant entrapments remain washable in water, the rate at which they diffuse into solution is much reduced by virtue of the highly viscous condition. Due to this relatively stable character of the penetrant entrapment, a relatively large number of the entrapments remain available for inspection.

It has been discovered that the water-washable penetrant compositions and the emulsifier compositions of the invention, when employed in a penetrant flaw tracer process, exhibit unusual and unexpected advantages in respect of the high level of flaw entrapment efficiency achieved.

In further regard to the degree of flaw entrapment efficiency obtained, it has been previously pointed out that oil-phase water-washable penetrants of conventional type exhibit poor flaw entrapment efficiency, unless the solubilizing strength of the detergent system employed is just sufficient, and no more, to render the oily component of the penetrant emulsifiable, or washable in water. The compositions of the present invention, in contrast, enable the use of unusually high solubilizing strengths, such as would normally lead to a low flaw entrapment efficiency. Nevertheless, high flaw entrapment efficiency is maintained, particularly in view of the above-discussed viscosity enhancement effects. The high solubilizing strengths of the compositions of the invention assure substantially complete removal of penetrant liquid from the test surfaces, and consequent absence of residues which are chemically reactive or which tend to yield unwanted background fluorescence.

As a further unusual and unexpected advantage provided by the compositions of the invention, a high degree of stability of the emulsions formed is achieved, along with the high level of flaw entrapment efficiency. Thus, as has already been pointed out, the emulsions which are formed in conventional penetrant flaw tracer processes tend to be unstable, exhibiting characteristics of phase separation, leading to re-precipitation of non-emulsified materials on the surfaces being cleaned; and to possible resultant intergranular corrosion, or chemical reactivity, particularly if the parts tested are used in liquid oxygen systems. In marked contrast, the emulsions formed through use of the compositions of the present invention exhibit a comparatively high degree of stability. Thus, the emulsions so formed can be diluted up to a ratio of 40:1 or higher, while still maintaining good stability.

EXAMPLE I

A penetrant flaw tracer liquid having the following formulation was prepared:

Nonylphenol _________________________________ parts __ 3
Polyoxyethylene sorbitan monolaurate _______ do ____ 12
Fluorescent dye (indicator), percent by weight of the formulation __________________________________ 1

The above penetrant liquid, when used in an inspection penetrant process, was wash-removable under a high pressure spray of water and yielded fluorescent indications of flaws at a sensitivity level corresponding to a medium sensitivity post-emulsifier type penetrant system.

EXAMPLE II

A penetrant flaw tracer liquid having the following formulation was prepared:

Sorbitan monoleate _______________________ ml __ 1500
Ethoxylated nonylphenol (9 mols ethylene oxide) ___________________________________ ml __ 1400
Methylene chloride _______________________ ml __ 1200
Fluorescent indicator dye _________________ gms __ 200

The above penetrant liquid, when used in an inspection penetrant process, may be applied by dipping, brush, air-spray, airless-spray, or electrostatic spray. When test parts to which this material is applied are allowed to drain for a few minutes, the methylene chloride ingredient evaporates, and the parts may then be washed in a mild spray of water to leave a clean background and stable flaw entrapments which exhibit a flaw detection capability corresponding to that of a super-sensitive post-emulsifier type penetrant system.

EXAMPLE III

A penetrant flaw tracer liquid having the following formulation was prepared:

Parts by volume
Sorbitan monooleate ______________________________ 10
Polyoxyethylene sorbitan monolaurate ______________ 10
Visible red dye __________________________________ 1

The above penetrant liquid, when used in a penetrant inspection process, was water-washable, and provided flaw entrapments of visible red color.

EXAMPLE IV

A penetrant flaw tracer liquid was prepared having the following formulation:

Parts by volume
Glycerin _________________________________________ 10
Ethoxylated dodecylphenol (12 mols ethylene oxide) _ 20
Sorbitan trioleate _______________________________ 15
Fluorescent dye _________________________________ .1

The above penetrant liquid, when employed in a penetrant inspection process, was water-washable, and provided flaw entrapments which were visible under black light.

EXAMPLE V

A penetrant flaw tracer liquid having the following formulation was prepared:

Parts by volume
Tripropylene glycol ______________________________ 9
Polyoxyethylene sorbitan monopalmitate __________ 18
Ethoxylated nonylphenol (1.5 mols ethylene oxide) _ 5
Fluorescent dye _________________________________ .2

The above penetrant liquid was found to be employable in a water-washable penetrant inspection process, and provided flaw entrapments which were visible under black light.

EXAMPLE VI

A penetrant flaw tracer liquid was prepared having the following formulation:

Parts by volume
Propylene glycol ________________________________ 11
Polyoxyethylene sorbitan monolaurate ___________ 15
Sorbitan trioleate _______________________________ 14
Visible blue dye _________________________________ 1.5

The above penetrant liquid, when used in a penetrant inspection process, was water-washable, and provided flaw entrapments of a visible blue color.

EXAMPLE VII

A penetrant flaw tracer liquid having the following formulation was prepared:

Parts by volume
Diesel fuel ______________________________________ 2
Polyoxyethylene mannitan monolaurate ___________ 15
Polyoxyethylene oxypropylene glucoside oleate _____ 16
Fluorescent dye _________________________________ 5

The above penetrant liquid, when employed in a penetrant inspection process, was water-washable. The flaw entrapments obtained were visible under black light, and the sensitivity in respect of fluorescent response was discovered to be unusually high.

As examples of the emulsifier compositions of the invention, each of the formulations of Examples I–VII was prepared, with the elimination of the dye constituent. Each of the resultant formulations was found suitable for use as the emulsifier in a post-emulsifier type of penetrant inspection process.

EXAMPLE VIII

An emulsifier composition was prepared having the following formulation:

Polyoxyethylene sorbitan monolaurate ____ gallons __ 25
Ethoxylated nonylphenol (1.5 mols ethylene oxide) ___________________________________ do ____ 6

The above emulsifier composition was employed in post-emulsifier processes, as set forth in Examples IX and X below. The above formulation was also modified for the purpose of employment in water-washable penetrant inspection processes, as described in Examples XI and XII below.

EXAMPLE IX

A penetrant inspection process in accordance with the invention, and of the post-emulsifier type, was carried out in the following manner:

An aluminum brake plate casting of conventional design was preliminarily cleaned and degreased in conventional manner, using an ethylene dichloride degreaser.

The brake plate was then dipped in a tank containing a standard MA-3 oily penetrant liquid meeting the U.S. Air Force Specification MIL-I-25135C(ASG), and containing a fluorescent indicator consisting of 0.5% each of C.I. Fluorescent Brightening Agent No. 68 and Fluorescent Brightening Agent No. 75. The brake plate was then withdrawn from the tank, and the excess penetrant was allowed to drain off from the surface thereof. A total dwell-drain time of 10 minutes was employed.

There was then applied over the surface of the brake plate an emulsifier composition of the invention in accordance with Example VIII. The emulsifier was applied by means of a dip process of conventional type. The brake plate was allowed to dwell in contact with the emulsifier for about one minute.

The brake plate was then washed in water by means of a high pressure spray. The washing step was carried out under continuous black light inspection. Excess water was then removed from the brake plate by means of an air hose.

The brake plate was then inspected under black light, and there were revealed a number of brilliantly fluorescent pin-points of light representing the flaws present in the surface of the brake plate.

EXAMPLE X

A penetrant process of the post-emulsifier type in accordance with the invention, and including a wet development step, was carried out in the following manner:

A test member, again in the form of an aluminum brake plate, was preliminarily cleaned and degreased, as already described in Example IX.

The brake plate was then dipped in a tank containing a penetrant liquid, consisting of perchloroethylene as a volatile solvent, and C.I. Solvent Red 76 as a visible dye indicator dissolved in said solvent in the proportion of 7 pounds per 55 gallon quantity. The brake plate was allowed to dwell in the penetrant liquid for 10 minutes and was then withdrawn for drainage and drying.

The brake plate was then dipped in an emulsifier composition of the invention, in the same manner as described in Example IX. Thereafter, the brake plate was washed in water, also as described in Example IX.

After washing, the brake plate was dipped in a conventional wet developer consisting of a suspension of talc particles in water, said talc particles being present in a concentration of about one-half pound (dry powder form) per gallon of water. The brake plate was then removed from the developer and allowed to dry. There were then observed visible dye indications of flaws present in the surface of the brake plate.

EXAMPLE XI

A water-washable penetrant inspection process in accordance with the invention was carried out in the following manner:

Here again, a brake plate was the test member and was preliminarily cleaned and degreased, as already described in Examples IX and X.

The brake plate was then dipped in a tank containing a water-washable penetrant flaw tracer liquid in accordance with the invention. Said penetrant liquid was made up of the formulation of Example VIII, said formulation having dissolved therein about 15 pounds of C.I. Fluorescent Brightening Agent No. 68, and about 3½ pounds of C.I. Fluorescent Brightening Agent No. 75. To the formulation there was also added water in the amount of 8 gallons in order to provide an adjustment to a desired level of the viscosity of the mixture.

After the dipping operation, the brake plate was removed from the tank and allowed to drain. The total dwell-drain time was 10 minutes. The brake plate was then washed by flushing thoroughly with water, in the manner already described.

Following the washing step, the surface of the brake plate was immediately inspected under black light. Surface flaws were then observed, as indicated by the fluorescent dye employed.

EXAMPLE XII

The water-washable penetrant inspection process of Example XI was carried out, being modified so as to include a wet development step. All of the steps up to and including the washing step were carried out, as already described. Thereafter, the brake plate was dipped in a conventional wet developer of the same type as described in Example X. The brake plate was then removed from the wet developer and dried. Upon subsequent inspection of the brake plate under black light, bright fluorescent indications of the surface flaws were exhibited.

I claim:

1. A gel-forming water-washable and normally liquid testing composition for use in the detection of surface discontinuities in test bodies, said composition consisting essentially of two basic surfactant constituents, the first of said constituents being a normally liquid lipophylic surfactant having an HLB value within the approximate range of zero to 7, and the second of said constituents being a normally liquid hydrophylic surfactant having an HLB value within the approximate range of 10 to 20, at least one of said basic constituents being a member selected from the group consisting of ethoxylated alcohols, ethoxylated amines, ethoxylated amides, ethoxylated fatty acids, ethoxylated fatty esters, ethoxylated vegetable oils, fatty esters, glycerol esters, monoglyceride derivatives, alkanolamides, sulfonated oils, sulfonated amides, sulfonated amines, alkyl sulfonates, diphenyl sulfonate derivatives, polyoxyethylene sorbitan monolaurate, polyoxyethylene sorbitan monostearate, polyoxyethylene sorbitan monopalmitate, polyoxyethylene sorbitan tristearate, polyoxyethylene sorbitan monooleate, polyoxyethylene sorbitan trioleate, polyoxyethylene sorbitol laurate, polyoxyethylene sorbitol hexaoleate, polyoxyethylene sorbitol septaoleate, polyoxyethylene oleate laurate, polyoxyethylene ester of mixed fatty and resin acid, polyoxyethylene ether alcohol, polyoxyethylene oxypropylene glucoside oleate, glycerol monooleate, sorbitan monooleate, sorbitan trioleate, and sorbitan partial fatty ester, and the other of said basic constituents being a member selected from the group consisting of ethoxylated alcohols, ethoxylated amines, ethoxylated amides, ethoxylated fatty acids, ethoxylated fatty esters, ethoxylated vegetable oils, fatty esters, glycerol esters, monoglyceride derivatives, alkanolamides, sulfonated oils, sulfonated amides, sulfonated amines, alkyl sulfonates, diphenyl sulfonate derivatives, alkylphenols, ethoxylated alkylphenols, polyoxyethylene sorbitan monolaurate, polyoxyethylene sorbitan monostearate, polyoxyethylene sorbitan monopalmitate, polyoxyethylene sorbitan tristearate, polyoxyethylene sorbitan monooleate, polyoxyethylene sorbitan trioleate, polyoxyethylene sorbitol laurate, polyoxyethylene sorbitol hexaoleate, polyoxyethylene sorbitol septaoleate, polyoxyethylene oleate laurate, polyoxyethylene ester of mixed fatty and resin acid, polyoxyethylene ether alcohol, polyoxyethylene oxypropylene glucoside oleate, glycerol monooleate, sorbitan monooleate, sorbitan trioleate, and sorbitan partial fatty ester, said second of said basic constituents being present in a relative concentration with respect to said first of said basic constituents of about 1.3 to 3, and the combination of said basic constituents being present within a range of proportional concentrations from about 40% to 100%, the remainder of the liquid constituents of said testing composition being a normally liquid extender solvent.

2. A gel-forming composition in accordance with claim 1 in which the said normally liquid extender solvent is at least one member selected from the group consisting of light mineral oil, base oil 100 pale, mineral thinner, kerosene, diesel fuel, isopropanol, fluorocarbon propellant, methylene chloride, perchloroethylene, trichloroethylene, normally liquid glycols, and water.

3. In the nondestructive testing of test bodies for surface discontinuities, the step of applying over the surface of a test body a liquid testing composition in accordance with claim 1.

4. A gel-forming water-washable and normally liquid testing composition for use in the detection of surface discontinuities in test bodies, said composition consisting essentially of two basic surfactant constituents, the first of said constituents being a normally liquid lipophylic surfactant having an HLB value within the approximate range of zero to 7, and the second of said constituents being a normally liquid hydrophylic surfactant having an HLB value within the approximate range of 10 to 20, at least one of said basic constituents being a member selected from the group consisting of ethoxylated alcohols, ethoxylated amines, ethoxylated amides, ethoxylated fatty acids, ethoxylated fatty esters, ethoxylated vegetable oils, fatty esters, glycerol esters, monoglyceride derivatives, alkanolamides, sulfonated oils, sulfonated amides, sulfonated amines, alkyl sulfonates, diphenyl sulfonate derivatives, polyoxyethylene sorbitan monolaurate, polyoxyethylene sorbitan monostearate, polyoxyethylene sorbitan monopalmitate, polyoxyethylene sorbitan tristearate, polyoxyethylene sorbitan monooleate, polyoxyethylene sorbitan trioleate, polyoxyethylene sorbitol laurate, polyoxyethylene sorbitol hexaoleate, polyoxyethylene sorbitol septaoleate, polyoxyethylene oleate laurate, polyoxyethylene ester of mixed fatty and resin acid, polyoxyethylene ether alcohol, polyoxyethylene oxypropylene glucoside oleate, glycerol monooleate, sorbitan monooleate, sorbitan trioleate, and sorbitan partial fatty ester, and the other of said basic constituents being a member selected from the group consisting of ethoxylated alcohols, ethoxylated amines, ethoxylated amides, ethoxylated fatty acids, ethoxylated fatty esters, ethoxylated vegetable oils, fatty esters, glycerol esters, monoglyceride derivatives, alkanolamides, sulfonated oils, sulfonated amides, sulfonated amines, alkyl sulfonates, diphenyl sulfonate derivatives, alkylphenols, ethoxylated alkylphenols, polyoxyethylene sorbitan monolaurate, polyoxyethylene sorbitan monostearate, polyoxyethylene sorbitan monopalmitate, polyoxyethylene sorbitan tristearate, polyoxyethylene sorbitan monooleate, polyoxyethylene sorbitan trioleate, polyoxyethylene sorbitol laurate, polyoxyethylene sorbitol hexaoleate, polyoxyethylene sorbitol septaoleate, polyoxyethylene oleate laurate, polyoxyethylene ester of mixed fatty and resin acid, polyoxyethylene ether alcohol, polyoxyethylene oxypropylene glucoside oleate, glycerol monooleate, sorbitan monooleate, sorbitan trioleate, and sorbitan partial fatty ester, said second of said basic constituents being present within a range of relative concentrations with respect to said first and said basic constituents of about 1.3 to 3, and the combination of said basic constituents being present within a range of proportional concentrations from about 40% to 100%, the remainder of the liquid constituents of said testing composition being a normally liquid extender solvent, and at least one indicator dye having a concentration within the approximate range of 0.1–40%.

5. A gel-forming composition in accordance with claim 4 in which the said normally liquid extender solvent is at least one member selected from the group consisting of light mineral oil, base oil 100 pale, mineral thinner, kerosene, diesel fuel, isopropanol, fluorocarbon propellant, methylene chloride, perchloroethylene, trichloroethylene, normally liquid glycols, and water.

6. A gel-forming composition in accordance with claim 4 in which said indicator dye is a fluorescent sensitizer.

7. A gel-forming composition in accordance with claim 4 in which said indicator dye is a dye of visible color.

8. In the nondestructive testing of test bodies for surface discontinuities, the step of applying over the surface of a test body a liquid testing composition in accordance with claim 4.

References Cited

UNITED STATES PATENTS 3,349,041 10/1967 Alburger __________ 252—301.2

TOBIAS E. LEVOW, *Primary Examiner.*

R. D. EDMONDS, *Assistant Examiner.*

U.S. Cl. X.R.

252—301.2, 408; 250—71